(No Model.) 4 Sheets—Sheet 1.
J. L. JOYCE.
MACHINE FOR MAKING EGG CARRIERS.
No. 355,995. Patented Jan. 11, 1887.
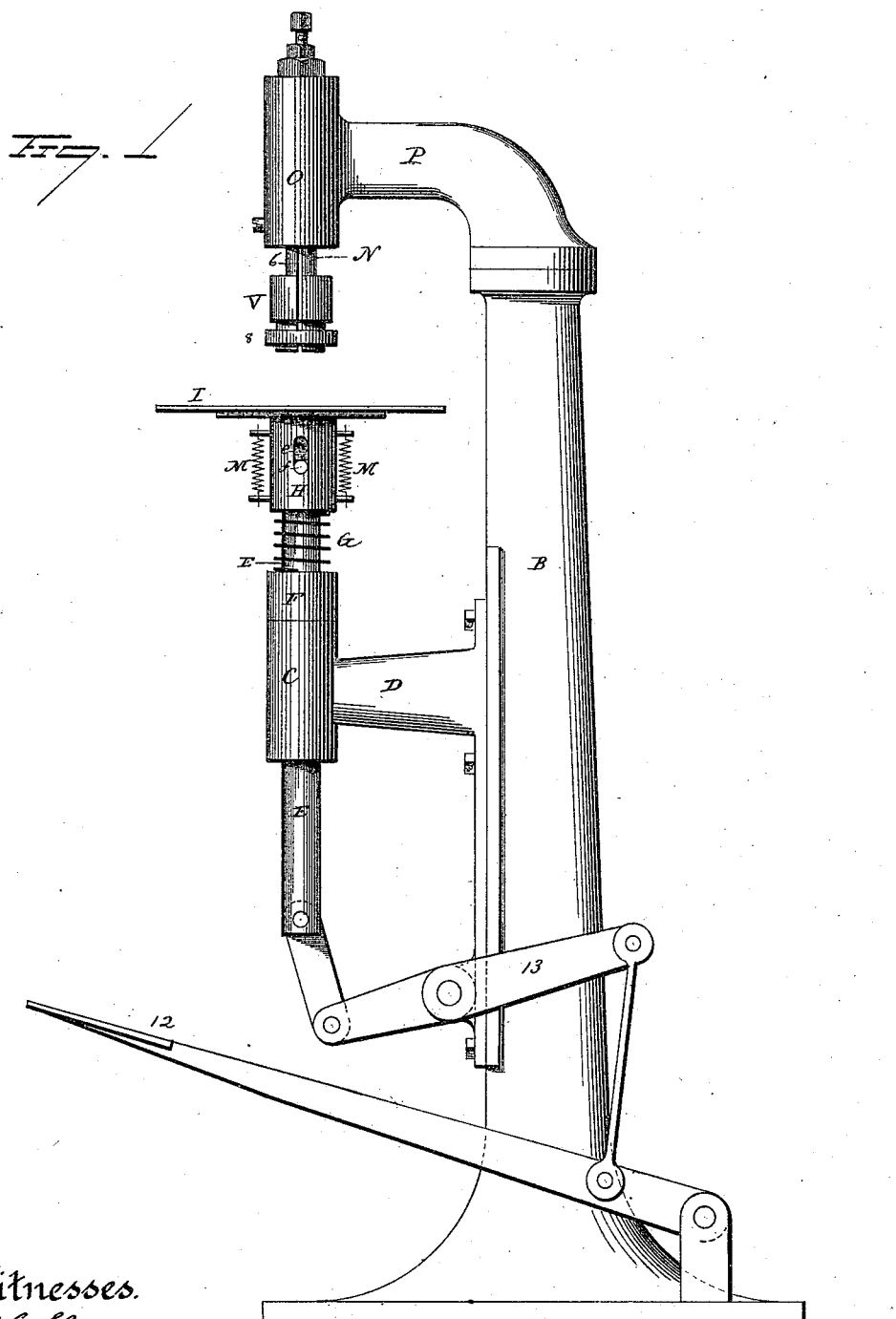
Witnesses.
J. H. Shumway
Fred C. Earle
Jos. L. Joyce,
Inventor.
By Atty.
Wm E. Earle (No Model.) 4 Sheets—Sheet 2.
J. L. JOYCE.
MACHINE FOR MAKING EGG CARRIERS.
No. 355,995. Patented Jan. 11, 1887.
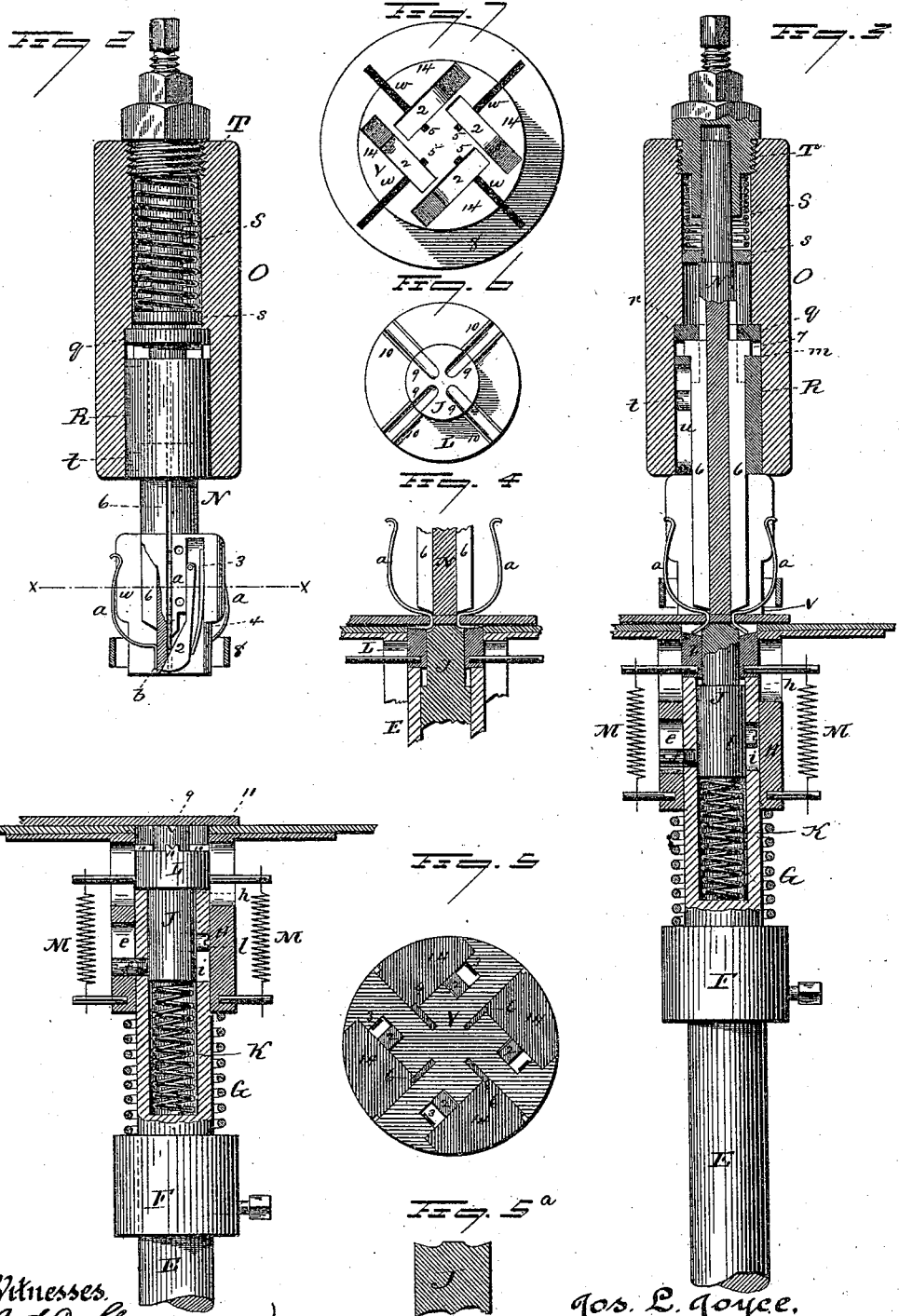

(No Model.) 4 Sheets—Sheet 3.
J. L. JOYCE.
MACHINE FOR MAKING EGG CARRIERS.
No. 355,995. Patented Jan. 11, 1887.
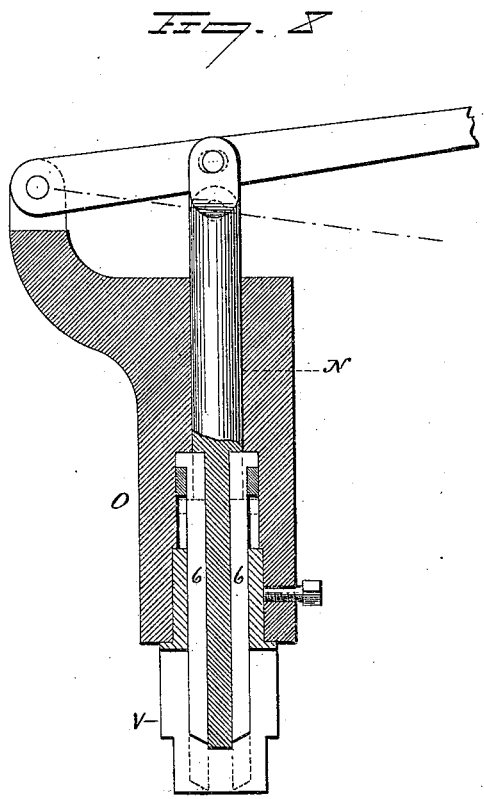
Witnesses. Jos. L. Joyce.
Inventor,
By Atty.

(No Model.) 4 Sheets—Sheet 4.
J. L. JOYCE.
MACHINE FOR MAKING EGG CARRIERS.

No. 355,995. Patented Jan. 11, 1887.

Witnesses
J. H. Shumway
Fred C. Earl

Jos. L. Joyce.
Inventor,
By Atty.

UNITED STATES PATENT OFFICE.

JOSEPH L. JOYCE, OF NEW HAVEN, CONNECTICUT.

MACHINE FOR MAKING EGG-CARRIERS.

SPECIFICATION forming part of Letters Patent No. 355,995, dated January 11, 1887.

Application filed June 1, 1886. Serial No. 203,742. (No model.)

*To all whom it may concern:*

Be it known that I, JOSEPH L. JOYCE, of New Haven, in the county of New Haven and State of Connecticut, have invented a new Improvement in Machines for Making Egg-Carriers; and I do hereby declare the following, when taken in connection with accompanying drawings and the letters of reference marked thereon, to be a full, clear, and exact description of the same, and which said drawings constitute part of this specification, and represent, in—

Figure 12:
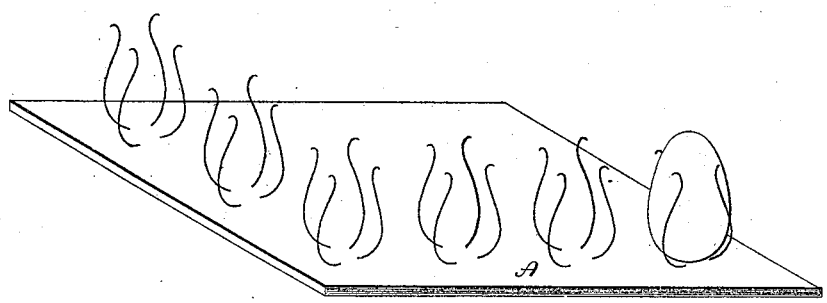
Figure 10:
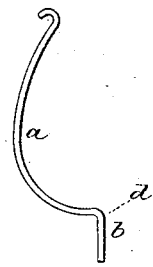
Figure 11:
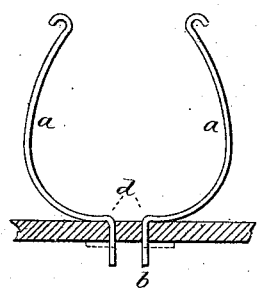
Figure 9:
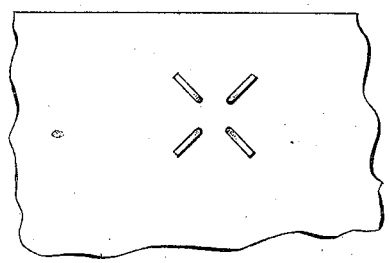

Figure 1, a side view of the machine complete; Fig. 2, a vertical sectional view through the working parts enlarged, and showing them in their normal condition with the springs in place for setting; Fig. 3, the same as Fig. 2, showing the parts in position of the first part of the act of setting. Fig. 4, the same view of the operative parts, showing the set as completely made; Fig. 5, a transverse section through the head on line $x\ x$; Fig. 5$^a$, a modification of the follower; Fig. 6, a top view of the follower and its collar; Fig. 7, an under-side view of the head; Fig. 8, a modification of the hammers and head; Fig. 9, an underside view of the plate, showing the lower ends of the springs turned upon the plate; Fig. 10, a side view of one of the springs, full size; Fig. 11, a section through the plate, showing two springs as introduced through the plate for setting; Fig. 12, a perspective view of a plate, showing the springs as set therein to form the holders.

This invention relates to the construction of a machine for setting the wires in egg-holders, such as those described in Letters Patent No. 314,942, granted to me March 31, 1885, the holders being employed for the transportation of eggs. The construction of such a holder I show in Figs. 12, 9, 10, and 11, and in which A represents a single plate. I prefer to apply four springs for the support of each egg. Each group of four springs is arranged independent of the others. The springs $a$ are each made from wire bent into shape, as seen in Fig. 10, their lower end, $b$, straight, and bent from the body of the spring, and so as to form a shoulder, as at $d$. These ends $b$ are introduced through a plate, as seen in Fig. 11. The straight portion, which extends through the plate, is bent back upon the under side of the plate, as indicated in broken lines, Fig. 11, and as seen in Fig. 9. The hole through the plate to receive the ends of the springs should be such as to closely fit the springs, the shoulders $d$ taking a bearing upon the upper side, and so that when the ends are turned back upon the reverse side of the plate the springs will be firmly held in place, and each in proper relation to the other, as seen in Fig. 12. The springs are curved outward from their lower end, upward, and inward, so as to embrace the eggs, their upper ends grasp above the largest diameter of the egg, as indicated in Fig. 1, the wire springs readily yielding for the introduction or removal of the eggs, yet of sufficient strength to retain the egg in place under ordinary usage in transportation. The plate is preferably made from thin wood.

The object of my invention is the construction of a machine for setting and securing the wire springs into the plate; and it consists in the construction, as hereinafter described, and more particularly recited in the claims.

In illustrating my invention I show it as operated by foot; but the method of operation, whether by foot or power, constitutes no part of my invention.

In the illustration, B represents an upright or post, by which the operative mechanism is supported.

C represents a vertical guide supported by a bracket, D, extending from the upright B. Within this guide C is a vertically-movable spindle, E, on which a collar, F, is fixed above the guide. On this collar, around the spindle E, a helical spring, G, rests, and on this spring a sleeve, H, rests, which carries the work-table I. Through the sleeve is a vertical slot, $e$, and through the slot a stud, $f$, extends into the spindle F, so as to permit a certain amount of vertical movement between the table and spindle independent of each other— that is to say, the spindle may be raised to a certain extent while the table remains stationary, or the table depressed while the spindle remains stationary. The upper part of the spindle E is tubular, as seen in Fig. 3, and in the upper end of the tubular part of the spindle is a follower, J, which rests upon a spring, K, below, and within the sleeve H, above the upper end of the spindle, is a collar, L, movable vertically in the outer sleeve.

To the collar L springs M are applied, one end of the springs connected to the collar L and the other to the sleeve H, as seen in Fig. 3, the tendency of the springs being to hold the collar L down upon the upper end of the spindle, as seen in Fig. 2.

The follower J is constructed with a shoulder, h, below the collar L, and so that the follower J, when in its normal position, as seen in Fig. 2, rests against the under side of the collar L. In the spindle is a vertical slot, i, through which a stud, l, in the follower J stands, and so as to permit a certain amount of vertical movement of the follower or spindle independent of each other. When the parts are in their normal position, the follower J is forced upward until the stud l rests against the upper end of the slot i, and which then brings the shoulder h substantially flush with the upper end of the spindle, the follower being held in that position by its spring K, while the table, with its sleeve H, is held in its up position by the spring G, bringing the lower end of the slot e against the stud f. Above the table and concentric with the spindle E is a second spindle, N, arranged in a vertical guide, O, supported by a bracket, P, extending from the upright, and so that the spindle N is in substantially a direct axial line with the spindle E, as seen in Fig. 2.

In the lower end of the guide O is an internal collar, R, fixed in the slide, but through which the spindle N extends. Directly above the collar R is a second collar, q, which rests against a shoulder, r, upon the inside of the guide O. The spindle extending up through the collar q is provided with a collar, s, fixed to the spindle or resting on a shoulder thereon. On this collar s, or may be a shoulder on the spindle, rests a spring, S, the other end of the spring taking a bearing against a plug, T, in the upper end of the guide, as seen in Figs. 2 and 3, the tendency of the spring being to force the spindle N down to its normal position, as seen in Fig. 2. The spindle is prevented from rotation, as well as limited in its vertical movement, by means of a stud, t, extending into a vertical slot, u, in the collar R, as seen in Figs. 2 and 3. The lower end of the spindle carries a head, V, in which four vertical radial slits, w, are formed. (See Fig. 7.) These slits are in width corresponding to the size of the wire springs to be set.

In a vertical recess on one side of each of the slits w a jaw, 2, is hung upon a pivot, 3, and to these jaws a spring, 4, is applied, tending to force them toward the opposite side of the slit, and, as seen in Fig. 2, the lower end or face of the jaws extending entirely across the slits, as seen in Figs. 2 and 7; but the slits extend inward beyond the jaws, as at 5, Fig. 7, so far as to form a recess sufficient to receive the lower end, b, of the springs. The slits w extend upward, and in the slits above the setting-hammers 6 are arranged, one corresponding to each slit w, the hammers shown in Figs. 2, 3, and 5. These hammers are thin pieces of steel, corresponding in thickness to the width of the slots, but so as to have sufficient freedom therein to permit the sleeve to move up and down without imparting movement to the hammers.

At the upper end the hammers are constructed with a lateral extension, 7, which rests between the shoulder m on the collar R and the collar q above, as seen in Fig. 3, so that the hammers are held stationary and so as to permit the spindle and its head to move up and down without imparting movement to the hammers.

Around the lower end of the head is a collar, 8, upon the inside of which are radial slots corresponding to the radial slits w, as seen in Figs. 2 and 7, leaving the slits open above the collar. The springs a are introduced into their respective slits over the collar, as seen in Fig. 2, the straight end b downward sets in back of the jaws 2, as seen in Fig. 2, and so that the shoulder or base of the spring will rest upon the upper face of the jaw, as seen in Fig. 2. This brings the straight end of the spring and its shoulder part directly beneath the hammers 6, as seen in Fig. 2.

The upper end of the follower J is constructed with radial grooves 9, (see Figs. 4 and 6,) the grooves extending from near the center outward and inclined downward, as seen in Fig. 4, the said grooves being directly beneath the slits in the head above, and the collar L upon its upper side is constructed with radial ribs 10, corresponding to the grooves 9 in the follower, as seen in Figs. 2 and 6, and in the upper surface of the said ribs is a groove corresponding to the grooves 9, and these grooves 10 incline outward and upward, as seen in Fig. 4.

The springs being inserted into the head, as seen in Fig. 2, and there held, the plate into which they are to be set is placed upon the table, as seen in Fig. 2, 11 representing the plate. Then the spindle E, with the table, is forced upward, as here represented, by a foot-pedal, 12, acting thereon through a lever, 13, and connections shown in Fig. 1, so that by pressing the foot downward the spindle and table will be raised. In such raising of the table it is brought against the under face of the head V, which causes the head, with its spindle, to rise and the springs to strike the hammers 6, as seen in Fig. 3, and so as to force the ends of the springs through the plate. The ends of the springs so forced through the plate first strike in the inclined grooves in the follower J and are deflected outward, as indicated in Fig. 3, and so as to bring the extreme ends over the grooves in the collar L, as seen in that figure. A continued upward movement of the table and spindle E now brings the collar L firm upon the end of the spindle, as seen in Fig. 3, and so that in the final upward movement of the spindle the collar L turns the ends of the springs hard up against the under side of the plate, as seen in Fig. 4, and so as to firmly set the springs therein. In such ascent of the spindle E and the table it carries the spring S yields, as seen in Fig. 3, for the ascent of the head and its spindle, and the respective springs K G also yield in the action of the follower J and collar L, and as also indicated in Fig. 3. As the table returns the head follows until it reaches its down position. The table continuing its descent, the operator holds the plate upon the table, causing the springs to pass down from the head through the slits inside the collar, the jaw 2 yielding for such downward movement, and so that the springs are withdrawn from the head firmly fixed in the plate. One group of springs having been thus set and discharged from the head, another group is introduced, the plate readjusted, and the second group set in its place in like manner as the first.

I have represented the spindle E as the moving part to force the plate onto the springs, while the head carrying the springs remains stationary under the hammers; but it will be understood this order of movement may be reversed without departing from the spirit of the invention.

In Figs. 5 and 7 the construction of the head for the introduction of the hammers and jaws is shown, and is, I believe, the best construction. The body of the head V has vertical recesses cut in its periphery and the grooves for the jaws and cutters formed therein. Then the recesses are filled by blocks 14 and secured therein, as shown in Figs. 5 and 7.

While I prefer to make the setting device in the form of the follower J, with the independent collar L, so that the operation is performed by the two parts separately, the upper end of the follower may be constructed so as to dispense with the collar L, and as seen in Fig. 5ᵃ. In this case the radial grooves in the follower are of sufficient extent to perform the complete setting operation, and in this case the spring for the follower would not be required, the follower being substantially made a fixed part of the spindle.

The table, while a convenience in supporting the plate in its proper relative position to the setting apparatus, may be dispensed with, the workman supporting the plate by hand.

I have represented the head V as movable and the hammers as stationary; but this arrangement may be reversed, the head made stationary and the hammers arranged to move downward, as indicated in Fig. 8. In this arrangement the head V is made fast in the support or guide O, having the same arrangement of slits and spring-jaws as first described, and the hammers 6 are attached to the spindle N, so that power being applied to the spindle, as shown, or otherwise, the hammers will be forced down when the plate is brought up against the head, and so that the ends of the springs will be forced through the plate, deflected, and set upon the reverse side, as before described.

I claim—

1. The combination of the head V, constructed with radial slits adapted to receive the respective springs to be set, hammers 6, arranged to work in said slits, a spring-jaw, 2, at each of said slits, a follower in axial line with said head, the said follower and head arranged to be moved the one toward the other, with mechanism, substantially such as described, to impart such movement to said parts, substantially as specified.

2. The combination of the head V, constructed with radial slits adapted to receive the respective springs to be set, hammers 6, arranged to work in said slits, a spring-jaw, 2, at each of said slits, a table with a follower working through it in axial line with said head, the said table with its follower, and the said head adapted to be moved the one toward the other, and with mechanism, substantially such as described, to impart such movement to said parts substantially as specified.

3. The combination of the spindle N, carrying the head V, the said head and spindle constructed with radial slits $w$, the said spindle supported in guides for longitudinal or axial movement, a spring to resist such longitudinal movement, a jaw, 2, hung upon one side of each of said slits, a fixed hammer, 6, in each of said slits, with a table below, and the follower J through said table and in axial line with the spindle N, the said spindle and follower movable the one toward the other, and with mechanism, substantially such as described, to impart such movement, substantially as described.

4. The combination of the head V, constructed with radial slits, a spring-jaw, 2, at each of said slits, hammers 6 in each of said slits, a table, a follower, J, in axial line with said spindle, spring K, supporting said spindle, collar L, surrounding said spindle, the said collar and follower constructed with radial grooves in their working-face corresponding to the slits and hammers in the spindle N, the said follower J, with its collar L, and the spindle N, movable the one toward the other, with mechanism, substantially such as described, to impart such movement, substantially as specified.

5. The combination of the spindle N, carrying the head V, constructed with radial grooves adapted to receive the springs to be set, spring-jaws 2 at each of said grooves, stationary hammer 6 in each of said grooves, spring S, arranged to resist longitudinal movement of said spindle, a spindle, E, follower J, and collar L, arranged therein, said spindle E, with its follower, and collar L being in axial line with the said spindle N, and the spindles, with the respective parts they carry, movable the one toward the other, a spring, K, arranged to support said follower J, a sleeve on said spindle E, carrying a table, a spring, G, between said sleeve and spindle and upon which said sleeve and table rest, and mechanism, substantially such as described, to impart said movement to said spindle E or N, substantially as specified.

6. The combination of the spindle N, carrying the head V, constructed with radial grooves adapted to receive the springs to be set, spring-jaws 2 at each of said grooves, stationary hammer 6 in each of said grooves, spring S, arranged to resist longitudinal movement of said spindle, a spindle, E, follower J, and collar L, arranged therein, said spindle, with its follower, and collar L being in axial line with the said spindle N, and the spindles, with the respective parts they carry, movable the one toward the other, a spring, K, arranged to support said follower J, a sleeve on said spindle E, carrying a table, a spring, G, between said sleeve and spindle and upon which said sleeve and table rest, a spring, M, between said collar L and sleeve H, with stops between said follower and spindle, and between said sleeve H and spindle, and mechanism, substantially such as described, to impart movement to one of said spindles toward the other, substantially as specified.

JOS. L. JOYCE.

Witnesses:
JOHN E. EARLE,
FRED C. EARLE.